United States Patent [19]
Yeh

[11] Patent Number: 6,070,181
[45] Date of Patent: May 30, 2000

[54] METHOD AND CIRCUIT FOR ENVELOPE DETECTION USING A PEEL CONE APPROXIMATION

[75] Inventor: Scott Yeh, Hsinchu Hsien, Taiwan

[73] Assignee: Chun-Shan Institute of Science and Technology, Taoyuan Hsien, Taiwan

[21] Appl. No.: 09/049,605

[22] Filed: Mar. 27, 1998

[51] Int. Cl.[7] .................................................. G06F 7/552
[52] U.S. Cl. ............................................................. 708/605
[58] Field of Search .............................................. 708/605

[56] References Cited

U.S. PATENT DOCUMENTS

| | | | |
|---|---|---|---|
| 3,829,671 | 8/1974 | Gathright et al. ....................... | 708/605 |
| 4,553,260 | 11/1985 | Belt et al. ................................ | 708/605 |
| 4,599,701 | 7/1986 | Vojir et al. .............................. | 708/605 |
| 4,694,417 | 9/1987 | Cantwell .................................. | 708/605 |
| 4,736,334 | 4/1988 | Mehrgardt ............................... | 708/605 |
| 4,747,067 | 5/1988 | Jagodmik, Jr. et al. ................ | 708/605 |
| 5,459,683 | 10/1995 | Vesugi et al. ........................... | 708/605 |
| 5,862,068 | 1/1999 | Onodera .................................. | 708/605 |

*Primary Examiner*—David H. Malzahn
*Attorney, Agent, or Firm*—William E. Pelton, Esq.

[57] ABSTRACT

An envelope detection method by using a peel cone approximation concept and an envelope detection circuit which implements the envelope detection method are disclosed. The envelope detection circuit includes an absolute value-determining circuit, a maximum/minimum value-determining circuit, a plurality sets of comparison circuits, an address encoder, a read only memory (ROM), and a multiplier/adder. A delaying circuit for synchronization is further included in the envelope detection circuit. With the method and the circuit for an envelope detection by using a peel cone approximation, advantages of a compact circuit structure, less operation latency, a low approximation error and a low cost are all achieved.

12 Claims, 5 Drawing Sheets

| LOCATION | P1 | P2 | P3 | P4 | P5 | ADDR | COEFFICIENTS | |
|---|---|---|---|---|---|---|---|---|
| PL1 | 0 | 0 | 0 | 0 | 0 | 000 | $a_1$ | $b_1$ |
| PL2 | 1 | 0 | 0 | 0 | 0 | 001 | $a_2$ | $b_2$ |
| PL3 | 1 | 1 | 0 | 0 | 0 | 010 | $a_3$ | $b_3$ |
| PL4 | 1 | 1 | 1 | 0 | 0 | 011 | $a_4$ | $b_4$ |
| PL5 | 1 | 1 | 1 | 1 | 0 | 100 | $a_5$ | $b_5$ |
| PL6 | 1 | 1 | 1 | 1 | 1 | 101 | $a_6$ | $b_6$ |

FIG. 3

METHOD AND CIRCUIT FOR ENVELOPE DETECTION USING A PEEL CONE APPROXIMATION

BACKGROUND OF THE INVENTION

1. The Field of the Invention

The present invention relates to a method and a circuit for an envelope detection by using a peel cone approximation. An envelope detection circuit is a converting circuit applied to applications such as a spread spectrum communication, an amplitude detection for radar systems, and a receiver demodulation and waveform generation, etc., for finding the square root of the sum of the two squares. Primarily, a concept which is different from conventional envelope detection concepts is used in the envelope detection method to achieve effects of both simplifying a circuit configuration and obtaining a low approximation error, which makes approximation to a physical calculated value through a peel cone approximation method.

2. Description of the Related Art

Presently, practical ways to be applied to a known envelope detection circuit are roughly categorized as follows.

1. A method of using coordinate rotation digital computer (CORDIC) is applied to a given envelope detection circuit. Although the CORDIC method achieves a remarkably high precision by using a multi-stage hardware, the configuration of the multi-stage hardware is extremely complicated, for example, the number of transistor gates required for a 16-stage hardware is up to 35000, and the latency for an operation is rather long, for example, a phenomenon of delaying 24 clock pulses occurs in the above situation, which does not meet an economical efficiency requirement.

2. A look-up table is used in a square root of the sum of two squares circuit. Mainly, various corresponding square roots of the sum of two squares in response to different kinds of input conditions are set into a memory. Though the circuit design for this method is the easiest and the most direct one, and has less operation latency, a quite large number of memories is inevitably required in the circuit, and thus it is not the best way to perform the approximation.

3. A half quadrature approximation method is applied to a given envelope detection circuit. Even though this method has an advantage of being a simple hardware structure, it cannot be actually applied since an approximation error is much too big, in which the maximum approximation error is up to 0.35 dB (8%).

Accordingly, not one of the above three methods can comply with the requirements of a simple circuit configuration, less operation latency and a low approximation error. An extraordinary approach is set forth in the present invention to meet all the above requirements plus being achieved at a low cost.

SUMMARY OF THE INVENTION

The present invention is directed to a method and a circuit for an envelope detection by using a peel cone approximation.

An objective of the present invention is to provide an envelope detection method by using a peel cone approximation for introducing a concept which is different from the conventional envelope detection concepts to achieve effects of both simplifying a circuit configuration and obtaining a low approximation error.

Another objective of the present invention is to provide an envelope detection circuit by using a peel cone approximation for finding the square root of the sum of two squares to achieve advantages of lowering a production cost and reducing the operation latency.

In accordance with one aspect of the invention, there is provided an envelope detection method by using a peel cone approximation, which includes a step of selecting a peel cone surface with a contained angle of 45° passing through an original point, a step of selecting a plurality of different planes to make an approximation to said peel cone surface, a step of solving a set of simultaneous linear equations with two variables, and a step of judging the plane where the values of x and y to be used to perform an envelope detection operation is substantially located and performing multiplication and addition operations based on the obtained constant values of a and b to find the square root of the sum of two squares of the values of x and y.

In accordance with another aspect of the invention, there is provided an envelope detection circuit by using a peel cone approximation, which includes an absolute value-determining circuit for determining positive values for values of x and y, a maximum/minimum value-determining circuit for determining a maximum value and a minimum value, a plurality sets of comparison circuits for comparing different combinations of the values of x and y and generating an output data, an address encoder for converting the output data into an address signal, a read only memory for selecting corresponding constant values of a and b based on the address signal, and a multiplier/adder for performing multiplication and addition operations on the constant values of a and b together with the values of x and y and outputting the square root of the sum of two squares of the values of x and y.

In accordance with still another aspect of the invention, there is provided an envelope detection circuit by using a peel cone approximation, which further includes a delaying circuit for a synchronization purpose.

BRIEF DESCRIPTION OF THE DRAWINGS

The above objective, other features and advantages of the present invention will become more apparent by describing in detail the preferred embodiment thereof with reference to the attached drawings, in which:

FIG. 3 is a table showing the relations among the outputs of the five comparison circuits, an address decoder and a ROM in accordance with the present invention;

DETAILED DESCRIPTION OF THE PREFERRED EMBODIMENT

In a geometrical space, if x and y are respectively referred to as parameters of a square root of the sum of two squares function required for an envelope detection, to find its square root of the sum of two squares, $z=(x^2+y^2)^{1/2}$, by using a square root of the sum of two squares operation device or a look-up table is the most direct and the most precise way. However, there exist shortcomings that a conventional square root of the sum of two squares operation circuit is so complicated and the quantity of the memories demanded for the operation circuit is relatively large, thus the present invention is achieved by considering another concept to be applied to an envelope detection circuit.

Figure 1:
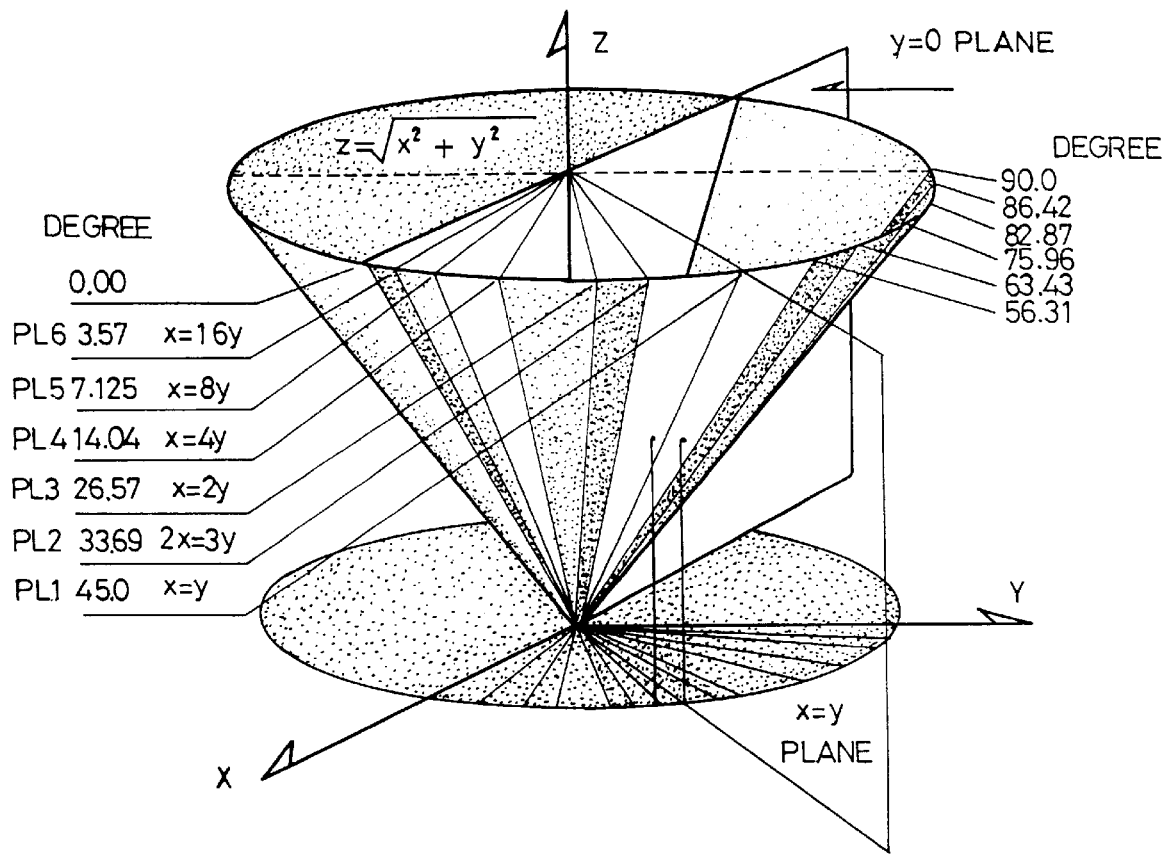
FIG. 1 shows a perspective view of a peel cone surface which is cut into six different planes from PL1 to PL6 in accordance with the present invention.

The square root of the sum of two squares function described above actually represents a cone surface which passes through an original point of a coordinate system and intersects with the Z axis by a contained angle of 45°, as shown in FIG. 1. Because the cone surface is not represented by a linear function, the peel cone surface has to be made up by performing a linear operation during a digital computation. Since the present invention makes an approximation by using a plurality of planes, only a peel cone surface having a contained angle of 45° intersected with the X-Y plane, which is cut into a plurality of planes passing through the original point, is taken. In an embodiment of the present invention, six different planes from PL1 to PL6 in FIG. 1 are taken. The Z-axis coordinates of any point on the peel cone surface can be represented by plane functions of those six planes described above which are in a form of $a_n X+b_n Y=Z$ where n=1 to 6, due to a symmetrical relation.

Referring to FIG. 1, conditions at which the peel cone surface is cut into six planes are x=y, 2x=3y, x=2y, x=4y, x=8y and x=16y, respectively. A set of simultaneous linear equations with two variables is solved by applying the above conditions into the plane functions, and constant values of a and b corresponding to the first plane PL1 through the sixth plane PL6 are respectively obtained as follows.

$a_1=0.7771$; $b_1=0.6371$ $a_2=0.8666$; $b_2=0.5029$ $a_3=0.9435$; $b_3=0.3490$ $a_4=0.9848$; $b_4=0.1839$ $a_5=0.9961$; $b_5=0.0933$ $a_6=0.9990$; $b_6=0.0468$

In fact, after the above coefficients of the six plane functions are obtained, the plane on which values of x and y are located is just required to be determined and then, multiplication and addition operations are performed to the corresponding constant values of a and b together with the values of x and y such that the square root of the sum of two squares, that is, the values of z, can be easily obtained.

Figure 2:
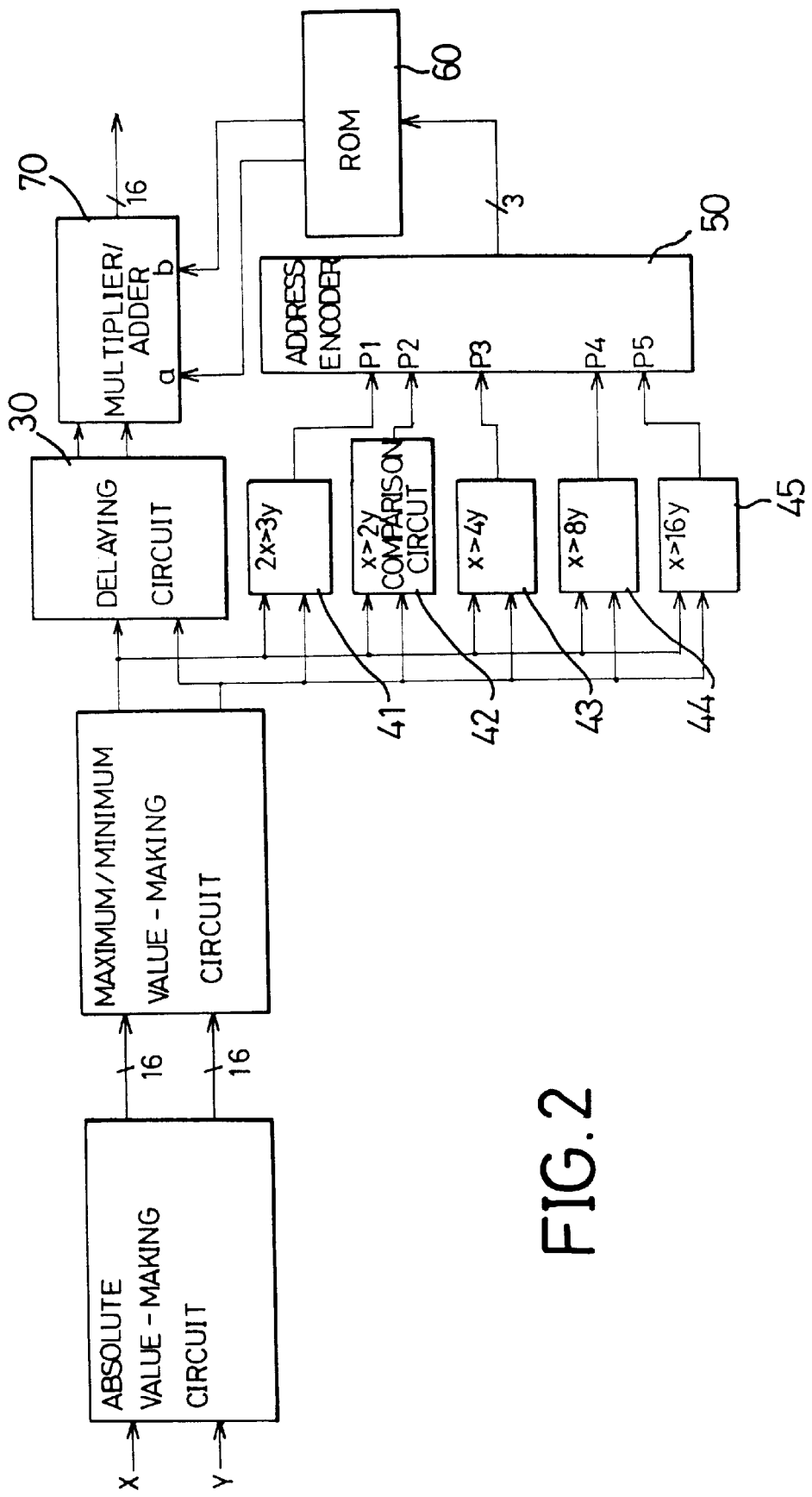
FIG. 2 is a schematic diagram showing a square root of the sum of two squares operation circuit in accordance with the present invention.

According to FIG. 1, the peel cone surface is cut by the six planes based on a ratio of x and y. Actually, that is, the plane on which values of x and y are located is determined just by considering the corresponding ratio between the values of x and y. As shown in FIG. 2, an operation circuit of square root of the sum of two squares operation device in accordance with the embodiment of the present invention is composed of five sets of comparison circuits 41 to 45 used for judging the values of x and y. Output data from each one set of the comparison circuits 41 to 45 is sent into an address encoder 50 and the address encoder 50 converts the "0" and "1" of each one of input points P1 to P5 thereof coming from each one set of the comparison circuits 41 to 45, as shown in FIG. 3, into address data from 000 to 101. Then, the data concerning the constant values of a and b with respect to each plane function read from a read only memory (ROM) 60 which stores the coefficient data of each plane function in advance are sent into a multiplier/adder 70 shown in FIG. 2 and the multiplication and addition operations, that is, $(a_n X+b_n Y)$ for n=1 to 6, are operated on the coefficient data and the values of x and y synchronously coming from a delaying circuit 30, which is substantially a latch in the preferred embodiment, and the multiplier/adder 70 outputs the square root of the sum of two squares z. Operations of determining an absolute value as well as a maximum value and a minimum value for incoming values of x and y are primarily performed by an absolute value-determining circuit 10 and a maximum/minimum value-determining circuit 20 on a left side in FIG. 2, respectively, such that a simplification of the operating circuit is achieved. In the comparison circuits 41 to 45, although a comparison circuit with a condition of x>y is not included in the operation circuit, an equivalent function can be obtained when the outputs of the five comparison circuits are all negative, that is, they are all "0." Therefore, the comparison circuit with the x>y condition can be omitted so as to simplify the circuit structure shown in FIG. 2 through directly outputting an address signal of 000 by the address encoder 50.

Figure 4:
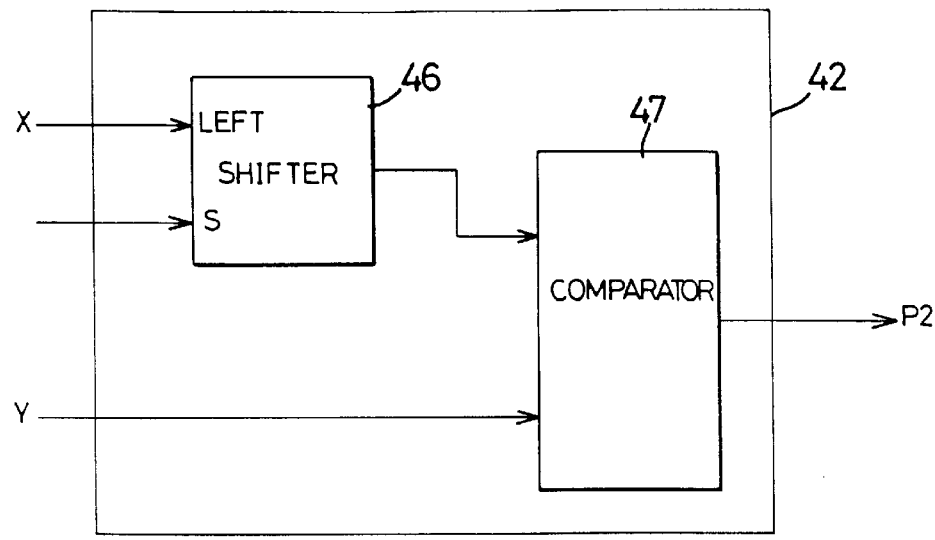
FIG. 4 is a schematic diagram showing an inner configuration of a comparison circuit having a condition of x>2y, or x>4y, or x>8y, or x>16y in accordance with the present invention.
Figure 5:
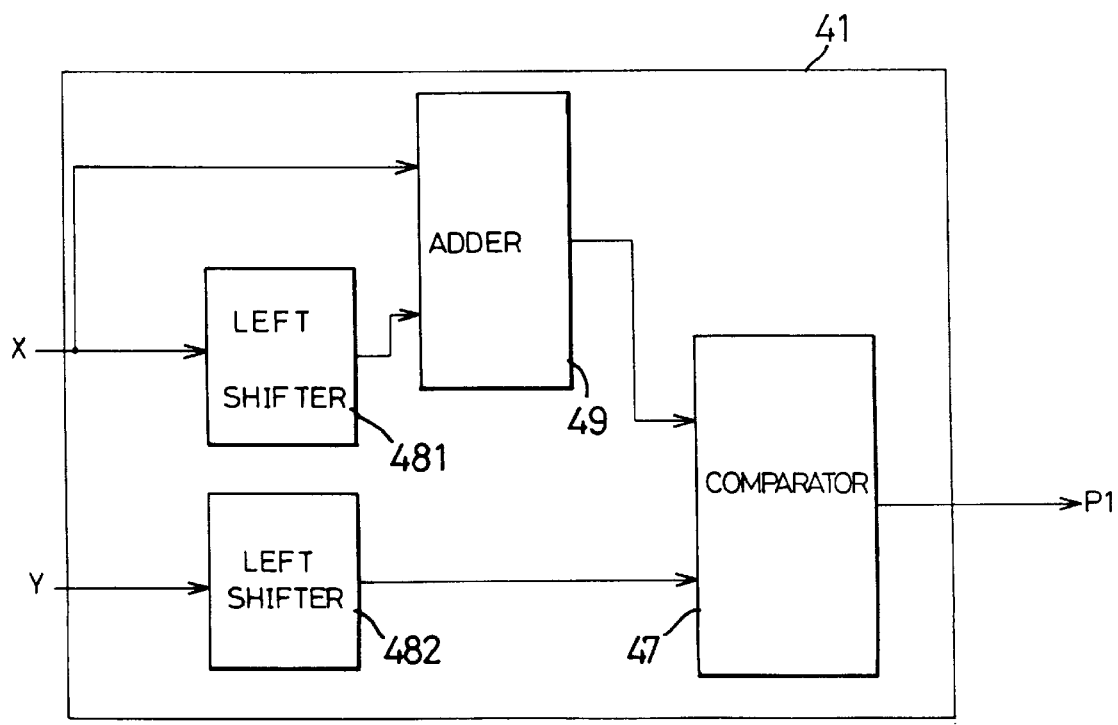
FIG. 5 is a schematic diagram showing an inner configuration of a comparison circuit having a condition of 2x>3y in accordance with the present invention.

In fact, a physical structure of each of the comparison circuits 41 to 45 described above is not necessarily composed by a complicated structure. As shown in FIG. 4, the second comparison circuit 42 to the fifth comparison circuit 45 with conditions of x>2y, x>4y, x>8y and x>16y, respectively, each is composed of a left shifter 46 and a comparator 47, in which the left shifter 46 has a shift-left pin S with a shift-left function, that is, a 16-bit 2's complement of y value is shifted left by one bit to achieve an effect of multiplying by 2. Thus, the second comparison circuit 42 to the fifth comparison circuit 45 can be configured by using the same structure. The first comparison circuit 41 with a condition of 2x>3y in FIG. 2 is implemented to be formed by using only two left shifters 481 and 482, an adder 49 and a comparator 47, as shown in FIG. 5, and the circuit structure thereof is not so complicated as in FIG. 2.

In FIG. 2, the input values of x, y and the output value z are all operated in a 16-bit notation, that is, x and y are 16-bit 2's complement inputs and z is a 16-bit 2's complement output. The absolute value-determining circuit 10, the maximum/minimum value-determining circuit 20, the five sets of comparison circuits 41 to 45, and the delaying circuit 30 are constructed by merely using 300 to 400 pieces of gates, while the multiplier/adder 70 requires about 5500 pieces of gates, the address encoder 50 needs only 20 pieces of gates or so, and the ROM 60 demands 50 pieces of gates only. Therefore, the quantity of the transistor gates required by the implemented operation circuit is around 8000 and thus this operation circuit achieves an advantage of saving the quantity of the transistors by several multiples when comparing with the quantity of the transistor gates in a conventional coordinate rotation digital computer which is likely to be 35000.

Figure 6:
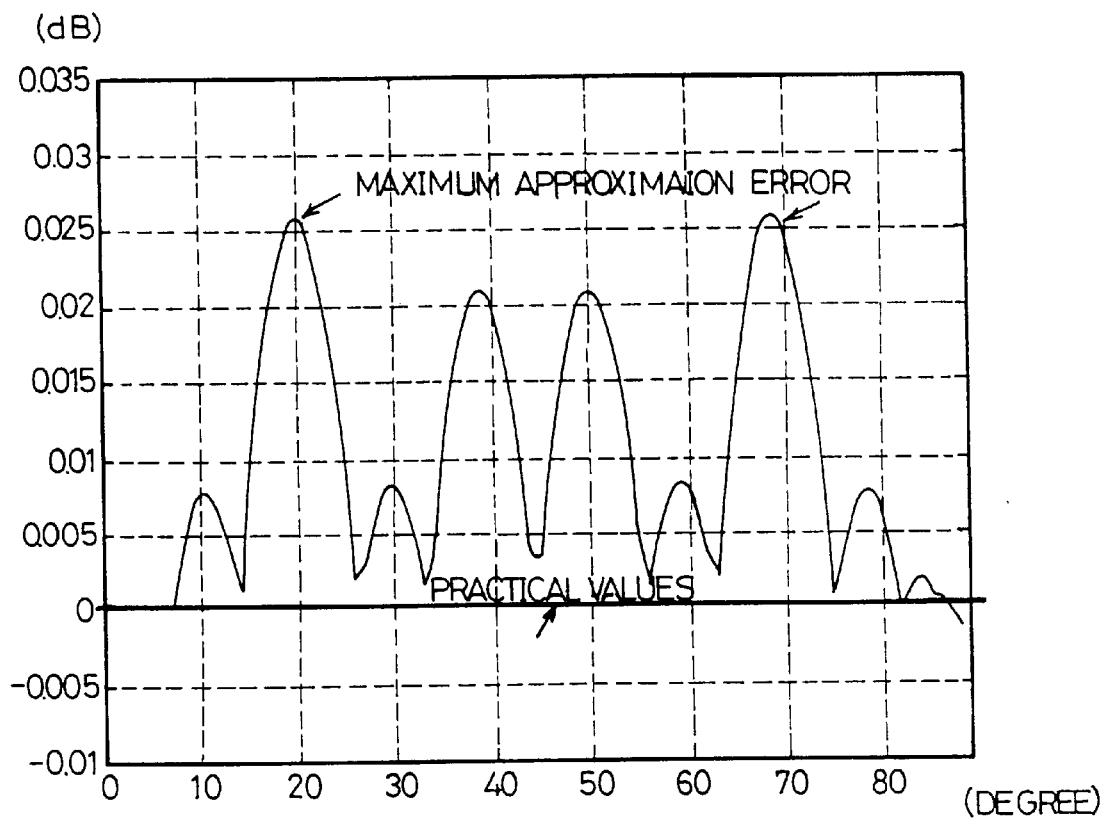
FIG. 6 is an approximation error graph showing values obtained from a square root of the sum of two squares operation circuit in comparison with the practical values calculated by performing a square root of the sum of two squares in accordance with the present invention.

With respect to a practical approximation error, as shown in FIG. 6, an approximation error graph shows values obtained from the square root of the sum of two squares operation circuit in comparison with those practically calculated by performing the square root of the sum of two squares operation. In the envelope detection method by using a peel cone approximation, the largest approximation error is occurred at about 20 degrees, and the value of the approximation error is just 0.026 dB (0.6%), which shows an allowance range of low approximation error.

While the present invention has been explained in relation to its preferred embodiment, it is to be understood that various modifications thereof will be apparent to those skilled in the art upon reading this specification. Therefore, it is to be understood that the invention disclosed herein is intended to cover all such modifications as fall within the scope of the appended claims.

I claim:

1. An envelope detection method by using a peel cone approximation, comprising steps of:

selecting a peel cone surface passing through an original point of a coordinate system and intersected with the Z axis by a contained angle of 45 degrees;

selecting a plurality of different planes passing through the original point and cutting said peel cone surface with a 45-degree contained angle so as to make an approximation to said peel cone surface with a 45-degree contained angle by combining the plurality of different planes;

solving a set of simultaneous linear equations with two variables based on values of x and y with respect to each plane to obtain constant values of a and b with respect to each plane function; and judging the plane where the values of x and y to be used to perform an envelope detection operation is substantially located and performing multiplication and addition operations based on the obtained constant values of a and b to find a square root of the sum of two squares of the values of x and y.

2. The envelope detection method by using a peel cone approximation as claimed in claim 1, wherein the quantity of the plurality of different planes is six.

3. The envelope detection method by using a peel cone approximation as claimed in claim 2, wherein the plane functions of the plurality of different planes are x=y, 2x=3y, x=2y, x=4y, x=8y and x=16y, respectively.

4. The envelope detection method by using a peel cone approximation as claimed in claim 1, wherein the plane functions of the plurality of different planes are x=y, 2x=3y, x=2y, x=4y, x=8y and x=16y, respectively.

5. The envelope detection method by using a peel cone approximation as claimed in claim 1, wherein an approximation error of said envelope detection method is below 0.6%.

6. An envelope detection circuit by using a peel cone approximation, comprising:

an absolute value-determining circuit for determining positive values for incoming values of x and y with a 16-bit notation;

a maximum/minimum value-determining circuit for determining a maximum value and a minimum value for the incoming values of x and y after their positive values are determined;

a plurality of comparison circuits for comparing different combinations of the values of x and y and generating an output data;

an address encoder for converting the output data of the plurality of comparison circuits into an address signal;

a read only memory for selecting corresponding constant values of a and b stored inside the read only memory in advance based on the address signal; and a multiplier/adder for performing multiplication and addition operations on the constant values of a and b from the read only memory together with the maximum value and the minimum value of the positive values of x and y from the maximum/minimum value-determining circuit and outputting a square root of the sum of two squares of the values of x and y.

7. The envelope detection circuit by using a peel cone approximation as claimed in claim 6, further comprising a delaying circuit allocated between the multiplier/adder and the maximum/minimum value-determining circuit.

8. The envelope detection circuit by using a peel cone approximation as claimed in claim 7, wherein said delaying circuit is substantially a latch.

9. The envelope detection circuit by using a peel cone approximation as claimed in claim 6, wherein each of said plurality sets of comparison circuits comprises at least one left shifter, at most one adder and a comparator.

10. The envelope detection circuit by using a peel cone approximation as claimed in claim 6, wherein the quantity of said plurality sets of comparison circuits is substantially set to be five.

11. The envelope detection circuit by using a peel cone approximation as claimed in claim 10, wherein respective determination conditions of said plurality sets of comparison circuits are 2x>3y, x>2y, x>4y, x>8y and x>16y, respectively.

12. The envelope detection circuit by using a peel cone approximation as claimed in claim 6, wherein said envelope detection circuit generates an approximation error below 0.6%.

* * * * *